United States Patent [19]

Coolegem et al.

[11] Patent Number: 5,727,152
[45] Date of Patent: Mar. 10, 1998

[54] INTERFACE ARRANGEMENT, AND TELECOMMUNICATION SYSTEM, AND METHOD

[75] Inventors: Karel Gerard Coolegem, Bonn; Karin Helena Maria Anstötz, Cologne, both of Germany

[73] Assignee: Koninklijke PTT Nederland N.V., Groningen, Netherlands

[21] Appl. No.: 643,857

[22] Filed: May 7, 1996

[30] Foreign Application Priority Data

May 8, 1995 [EP] European Pat. Off. ............ 95201183.1

[51] Int. Cl.$^6$ ................. G06F 13/00; H04B 1/38
[52] U.S. Cl. ............ 395/200.14; 395/823; 395/824; 395/831; 395/829; 395/846; 370/464; 370/466; 370/465; 370/382
[58] Field of Search ............... 395/200.14, 823, 395/824, 828–831, 840–842, 846, 851, 852, 882, 883, 884; 370/464, 465, 466, 382, 383

[56] References Cited

U.S. PATENT DOCUMENTS

| | | | |
|---|---|---|---|
| 5,136,582 | 8/1992 | Firoozmand | 370/400 |
| 5,153,884 | 10/1992 | Lucak et al. | 371/32 |
| 5,251,207 | 10/1993 | Abensour et al. | 370/473 |
| 5,432,839 | 7/1995 | DeLuca | 379/57 |
| 5,434,978 | 7/1995 | Dockter et al. | 395/200.01 |
| 5,495,599 | 2/1996 | Nishiyama | 395/185.09 |
| 5,566,173 | 10/1996 | Steinbrecher | 370/466 |
| 5,568,487 | 10/1996 | Sitbon et al. | 370/466 |
| 5,577,033 | 11/1996 | Chang et al. | 370/402 |
| 5,581,558 | 12/1996 | Horney, II et al. | 370/401 |
| 5,586,117 | 12/1996 | Edem et al. | 370/466 |
| 5,634,077 | 5/1997 | Yagi et al. | 395/868 |

FOREIGN PATENT DOCUMENTS 0560706  9/1993  European Pat. Off. .

OTHER PUBLICATIONS

K.K. Sy et al., "OSI–SNA interconnections", IBM Systems Journal, 26(1987), vol. 26, No. 2, pp. 157–170.

*Primary Examiner*—James P. Trammell
*Assistant Examiner*—Tuan Q. Dam
*Attorney, Agent, or Firm*—Michaelson & Wallace; Peter L. Michaelson

[57] ABSTRACT

Known interface arrangements for coupling a first arrangement based on a first protocol and a second arrangement based on a second protocol are not flexible. By providing a memory of the interface arrangement with at least a first memory field for storing second information elements and a second memory field for storing third information elements, and by comparing a first information element received from the first arrangement with the stored second information element and in case of equality supplying either the received first information element or the stored second information element to the second arrangement and in case of inequality further comparing the received first information element with the stored third information element and selecting a stored second information element which corresponds to the stored third information element and supplying the selected stored second information element to the second arrangement, an interface arrangement is created which is very flexible.

15 Claims, 1 Drawing Sheet

INTERFACE ARRANGEMENT, AND TELECOMMUNICATION SYSTEM, AND METHOD

A BACKGROUND OF THE INVENTION

The invention relates to an interface arrangement for coupling a first arrangement based on a first protocol and a second arrangement based on a second protocol, which interface arrangement is provided with

- a receiver for receiving a first information element based on the first protocol from the first arrangement,
- a transmitter for transmitting a second information element based on the second protocol towards the second arrangement in response to the received first information element,
- a control arrangement comprising a memory for storing information elements.

Such an interface arrangement is known from U.S. Pat. No. 5,153,884 (this patent is incorporated by reference herein), and comprises the receiver (the "receive section" in U.S. Pat. No. 5,153,884), the transmitter (the "transmit section" in U.S. Pat. No. 5,153,884), and the control arrangement (the "interface controller" in U.S. Pat. No. 5,153,884) comprising the memory (the "shared memory" in U.S. Pat. No. 5,153,884). When the first protocol and the second protocol are the same, this interface arrangement prepares a responsive message for transmission while the message to which it responds is still being received. The interface arrangement could further be used in a wide variety of networks with differing protocols.

Such an interface arrangement is disadvantageous because of not being flexible.

B SUMMARY OF THE INVENTION

It is an object of the invention to provide an interface arrangement as described above, which should be flexible.

The interface arrangement according to the invention is characterised in that the memory is provided with at least a first memory field for storing second information elements and a second memory field for storing third information elements, the control arrangement being provided with

- a comparator for comparing the received first information element with a stored information element and for generating a first control signal in case of equality and for generating a second control signal in case of inequality,
- a first supplier for supplying a stored second information element to the comparator for comparing the received first information element with the stored second information element and for, in response to the first control signal, supplying at least one of the received first information element and the stored second information element to the transmitter, and
- a second supplier for, in response to the second control signal, supplying a stored third information element to the comparator for further comparing the received first information element with the stored third information element and for, in response to a further first control signal, selecting a stored second information element which corresponds to the stored third information element and supplying the selected stored second information element to the transmitter.

To the first supplier supplies the stored second information element to the comparator for comparing the received first information element with the stored second information element and, in response to the first control signal or, in other words in case of equality between the received first information element and the stored second information element, supplies the stored second information element to the transmitter. The second supplier, in response to the second control signal, or in other words inequality between the received first information element and the stored second information element, supplies the stored third information element to the comparator for further comparing the received first information element with the stored third information element and, in response to a further first control signal or in other words equality between the received first information element and the stored third information element, selects the stored second information element which corresponds to this stored third information element and supplies the selected stored second information element to the transmitter. Consequently, an interface arrangement is provided which is very flexible.

Further, with the interface arrangement according to the invention, when the first protocol and the second protocol are the same, protocol errors can be corrected, by storing all correct information elements as second information elements in the first memory field and by storing incorrect information elements (in other words deviations) as third information elements in the second memory field, which third information elements should each correspond to one second information element. In this case, when in the first memory field a second information element which is equal to the received first information element cannot be found, a search is started in the second memory field for a third information element which should be equal to the received first information element, and as soon as such a third information element has been found, the second information element which corresponds to this third information element is transmitted.

Again further, with the interface arrangement according to the invention, it becomes possible that the first protocol and the second protocol are slightly different, by storing all second information elements in the first memory field and by storing all possible deviations as third information elements in the second memory field, which third information elements should each correspond to one second information element. In this case, when in the first memory field a second information element which is equal to the received first information element cannot be found, a search is started in the second memory field for a third information element which should be equal to the received first information element, and as soon as such a third information element has been found, the second information element which corresponds to this third information element is transmitted.

The invention is based, inter alia, on the insight that when second information elements which have a high probability are stored in the first memory field and third information elements which have a low probability are stored in the second memory field, a search for an equal information element should start in the first memory field and, if necessary, end in the second memory field.

The problem of the low flexibility of known interface arrangements is thus solved by creating a first memory field for information elements having a high probability and creating a second memory field for information elements having a low probability.

It is observed that, instead of supplying the stored second information element to the transmitter, it is also possible to supply the received first information element to the transmitter, in case this received first information element is equal to said stored second information element.

A first embodiment of the interface arrangement according to the invention is characterised in that the control arrangement is further provided with a first selector for selecting a first number of stored second information elements and for controlling the first supplier for supplying this first number of stored second information elements to the comparator subsequently in response to subsequent second control signales, and a second selector for selecting a second number of stored third information elements and for controlling the second supplier for supplying this second number of stored third information elements to the comparator subsequently in response to subsequent further second control signales.

The first selector selects the first number of stored second information elements and controls the first supplier for supplying this first number of stored second information elements to the comparator subsequently in response to subsequent second control signals. The second selector selects the second number of stored third information elements and controls the second supplier for supplying this second number of stored third information elements to the comparator subsequently in response to subsequent further second control signales. Consequently, the first number of stored second information elements (in other words not all of them) are supplied to the comparator for comparing the received first information element with these stored second information elements. Also, as a result, only the second number of stored third information elements (in other words not all of them) are supplied to the comparator for further comparing the received first information element with these stored third information elements. In response to the first control signal or in other words in case of equality between the received first information element and one of the stored second information elements, this particular stored second information element is supplied to the transmitter. In response to the further first control signal or in other words equality between the received first information element and one of the stored third information elements, the stored second information element which corresponds to this particular stored third information element is supplied to the transmitter.

With such an interface arrangement, which is extremely flexible, protocol states can be taken into consideration.

A second embodiment of the interface arrangement according to the invention is characterised in that the memory is further provided with at least a third memory field for storing frequency parameters which correspond to the stored second information elements, the control arrangement being further provided with an adaptor for, in response to the first control signal, adapting a stored frequency parameter, which frequency parameter corresponds to the second information element which is equal to the received first information element.

The adaptor, in response to the first control signal, adapts the stored frequency parameter, which frequency parameter corresponds to the second information element which is equal to the received first information element. Hence, in time for each second information element stored in the first memory field, there is a corresponding frequency parameter having a certain value and stored in the third memory field. Then the possibility is offered, in case a stored second information which is equal to the received first information element cannot be found, of choosing between either looking for an equal third information element stored in the second memory field or selecting the second information element of which the frequency parameter stored in the third memory field has a certain value or performing both functions subsequently.

A third embodiment of the interface arrangement according to the invention is characterised in that the control arrangement is further provided with a selector for, in response to the second control signal, selecting an extreme frequency parameter and a corresponding second information element.

The selector, in response to the second control signal, selects an extreme frequency parameter and a corresponding second information element, in case a stored second information element which is equal to the received first information element cannot be found. Thus, the second information element is selected of which the corresponding frequency parameter stored in the third memory field has an extreme value with respect to other frequency parameters.

A fourth embodiment of the interface arrangement according to the invention is characterised in that the memory is further provided with at least a fourth memory field for storing further frequency parameters, the control arrangement being further provided with a further adaptor for, in response to the further first control signal, adapting a stored further frequency parameter, which further frequency parameter corresponds to the third information element which is equal to the received first information element.

The further adaptor, in response to the further first control signal, adapts the stored further frequency parameter, which further frequency parameter corresponds to the third information element which is equal to the received first information element. Hence, in time for each third information element stored in the second memory field, there is a corresponding further frequency parameter having a further certain value and stored in the fourth memory field. Then the possibility is offered, in case a stored third information which is equal to the received first information element cannot be found, of choosing between either selecting the third information element of which the further frequency parameter stored in the fourth memory field has a further certain value or selecting the second information element of which the frequency parameter stored in the third memory field has a certain value or performing both functions subsequently.

A fifth embodiment of the interface arrangement according to the invention is characterised in that the control arrangement is further provided with a further selector for, in response to the further second control signal, selecting an extreme further frequency parameter and a corresponding third information element.

The further selector, in response to the further second control signal, selects an extreme further frequency parameter and a corresponding third information element, in case a stored third information element which is equal to the received first information element cannot be found. As a result third information element is selected of which the corresponding further frequency parameter stored in the fourth memory field has an extreme further value with respect to other further frequency parameters.

A sixth embodiment of the interface arrangement according to the invention is characterised in that the memory is further provided with at least a fifth memory field for storing first information elements and a sixth memory field for storing fourth information elements, the control arrangement being further provided with a third supplier for supplying a stored first information element to the comparator for again further comparing the received first information element with the stored first information element and for, in response to an again further first control signal, deactivating a fourth supplier for supplying a stored fourth information element to the comparator and deactivating a fourth selector for selecting a fourth number of stored fourth information elements and for controlling the fourth supplier, and a third selector for selecting a third number of stored first information elements and for controlling the third supplier for supplying this third number of stored first information elements to the comparator subsequently in response to subsequent again further second control signales.

The third supplier supplies the stored first information element to the comparator for again further comparing the received first information element with the stored first information element and, in response to an again further first control signal, deactivates a fourth supplier for supplying a stored fourth information element to the comparator and deactivating a fourth selector for selecting a fourth number of stored fourth information elements and for controlling the fourth supplier. Also, third selector selects the third number of stored first information elements and controls the third supplier for supplying this third number of stored first information elements to the comparator subsequently in response to subsequent again further second control signales. Consequently, as a result, interface arrangement is provided with which different protocols (one belonging to first information elements and one belonging to fourth information elements) as well as different protocol states can be taken into consideration.

It is observed that instead of using frequency parameters and/or further frequency parameters it is also possible to calculate distances between the received first information element and the second information elements and/or third information elements and to select one second information element or one third information element which has, for example, the smallest distance with respect to the received first information element.

It is further observed that all embodiments could be combined in an arbitrary way, and that the invention thus also relates to each possible combination of two or more embodiments.

The invention further relates to a telecommunicationsystem comprising a first arrangement based on a first protocol and a second arrangement based on a second protocol and the interface arrangement according to (an embodiment of) the invention for coupling the first arrangement based on the first protocol and the second arrangement based on the second protocol.

The invention again further relates to a method for coupling a first arrangement based on a first protocol and a second arrangement based on a second protocol, which method comprises the steps of receiving a first information element based on the first protocol from the first arrangement, transmitting a second information element based on the second protocol towards the second arrangement in response to the received first information element, comparing the received first information element with a stored information element and generating a first control signal in case of equality and generating a second control signal in case of inequality.

Such a method is known from U.S. Pat. No. 5,153,884 and is disadvantageous because of not being flexible.

It is a further object of the invention to provide a method as described above which should be flexible.

The method according to the invention is characterised in that the method comprises the steps of supplying a stored second information element and comparing the received first information element with the stored second information element and, in response to the first control signal, transmitting at least one of the received first information element and the stored second information element, and in response to the second control signal, supplying a stored third information element and further comparing the received first information element with the stored third information element and, in response to a further first control signal, selecting a stored second information element which corresponds to the stored third information element and transmitting the selected stored second information element.

A first embodiment of the method according to the invention is characterised in that the method comprises the steps of selecting a first number of stored second information elements and comparing this first number of stored second information elements subsequently with the received first information element in response to subsequent second control signales, and selecting a second number of stored third information elements and further comparing this second number of stored third information elements subsequently with the received first information element in response to subsequent further second control signales.

A second embodiment of the method according to the invention is characterised in that the method comprises the step of, in response to the first control signal, adapting a stored frequency parameter, which frequency parameter corresponds to the second information element which is equal to the received first information element.

A third embodiment of the method according to the invention is characterised in that the method comprises the step of, in response to the second control signal, selecting an extreme frequency parameter and a corresponding second information element.

A fourth embodiment of the method according to the invention is characterised in that the method comprises the step of, in response to the further first control signal, adapting a stored further frequency parameter, which further frequency parameter corresponds to the third information element which is equal to the received first information element.

A fifth embodiment of the method according to the invention is characterised in that the method comprises the step of, in response to the further second control signal, selecting an extreme further frequency parameter and a corresponding third information element.

A sixth embodiment of the method according to the invention is characterised in that the method comprises the steps of supplying a stored first information element and again further comparing the received first information element with the stored first information element and, in response to an again further first control signal, deactivating the supplying of a stored fourth information element and deactivating the selecting of a fourth number of stored fourth information elements, and selecting a third number of stored first information elements and again further comparing this third number of stored first information elements subsequently with the received first information element in response to subsequent again further second control signales.

BRIEF DESCRIPTION OF THE DRAWING

The invention will be explained at the hand of an embodiment disclosed in FIG. 1, which shows an interface arrangement according to the invention.

DETAILED DESCRIPTION

Figure 1:
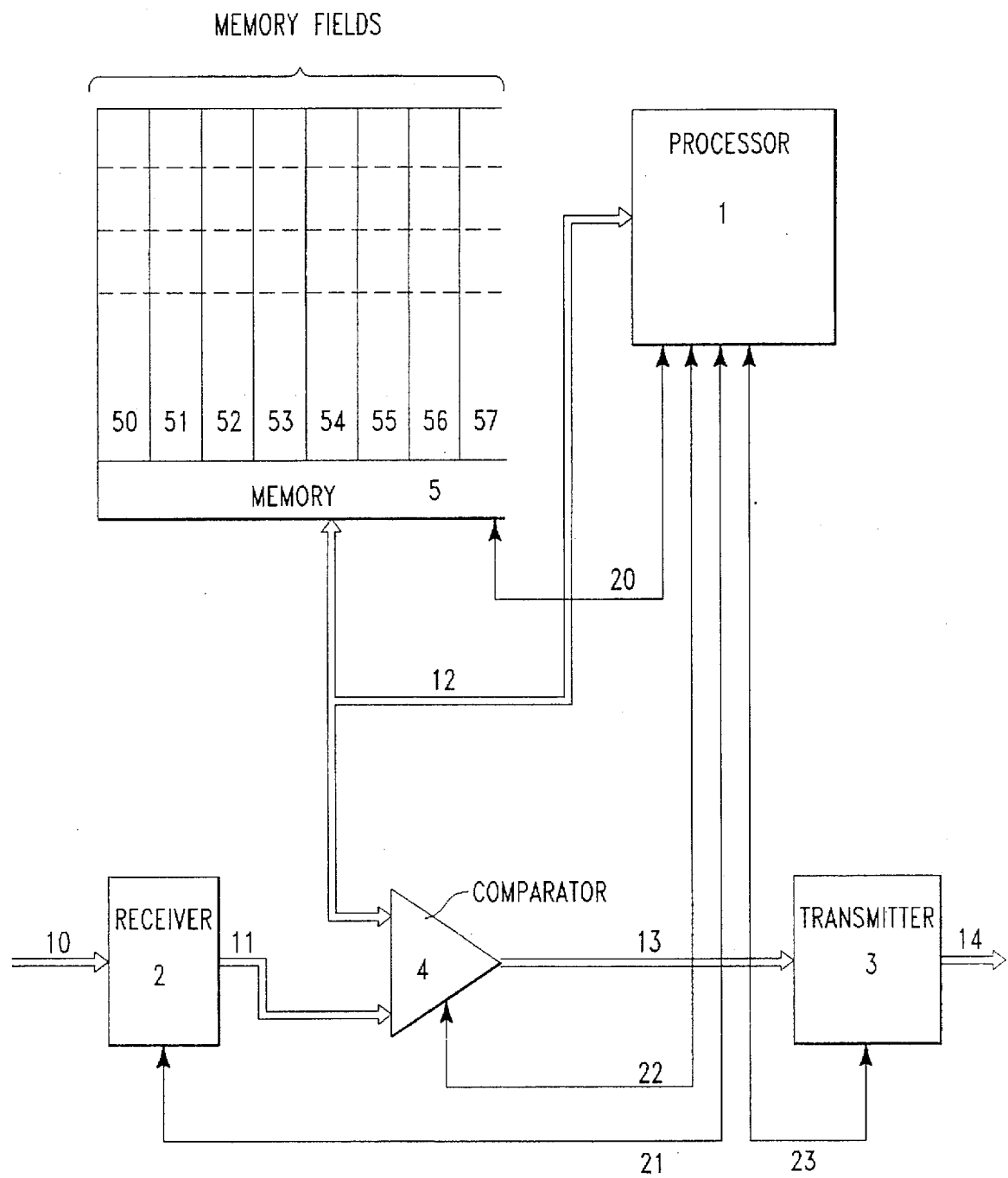

The interface arrangement shown in FIG. 1 comprises a processor 1, which is coupled to a receiver 2 via a control connection 21 and to a transmitter 3 via a control connection 23 and to a comparator 4 via a control connection 22 and to a memory 5 via a control connection 20. Receiver 2 is provided with an input coupled to a bus 10 for receiving information elements and is provided with an output coupled to a first input of comparator 4 via a bus 11. Comparator 4 is provided with a second input coupled to an input/output of memory 5 via a bus 12 and to an input/output of processor 1 via bus 12 and is provided with an output coupled to an input of transmitter 3 via a bus 13. Transmitter 3 is provided with an output coupled to a bus 14 for transmitting information elements. Memory 5 is provided with a first memory field 50, a second memory field 51, a third memory field 52, a fourth memory field 53, a fifth memory field 54, a sixth memory field 55, a seventh memory field 56 and further memory fields 57. Processor 1, comparator 4 and memory 5 together form a so-called control arrangement.

The interface arrangement shown in FIG. 1 operates as follows. A first information element based on a first protocol and coming from a first arrangement based on the first protocol (for instance a first telecommunication exchange or a first telecommunication terminal or a first telecommunication node) arrives via bus 10 at the input of receiver 2. Processor 1 is informed of the arrival of this first information element via control connection 21. Via control connection 20 processor 1 (acting as a first supplier) addresses the first memory field 50, in response to which memory 5 generates a stored second information element based on a second protocol, which is supplied to the second input of comparator 4 via bus 12. Via control connection 21 processor 1 informs receiver 2 that the first information element is to be supplied to the first input of comparator 4 via bus 11. Comparator 4 compares both information elements and generates a first control signal in case of equality and generates a second control signal in case of inequality, which control signals are to be supplied to processor 1 via control connection 22.

In response to a first control signal processor 1 informs comparator 4 via control connection 22 that for example the second information element is to be supplied to transmitter 3 via bus 13 and informs transmitter 3 via control connection 23 that the second information element at the input of transmitter 3 is to be transmitted via bus 14 to a second arrangement based on the second protocol (for instance a second telecommunication exchange or a second telecommunication terminal or a second telecommunication node). Further, processor 1 then addresses the third memory field 52, in response to which memory 5 generates a frequency parameter which corresponds to the second information element, which frequency parameter is supplied to processor 1 via bus 12. Processor 1 (acting as an adaptor) adapts this frequency parameter, for example by adding one unit to it, and sends the adapted frequency parameter back to memory 5 via bus 12, and addresses the third memory field 52, in response to which the adapted frequency parameter is stored.

In response to a second control signal processor 1 (acting as a second supplier) addresses the second memory field 51 via control connection 20, in response to which memory 5 generates a stored third information element, which is supplied to the second input of comparator 4 via bus 12. Comparator 4 further compares both information elements and generates a further first control signal in case of equality and generates a further second control signal in case of inequality, which control signals are to be supplied to processor 1 via control connection 22.

In response to a further first control signal, processor 1 addresses the first memory field via control connection 20, in response to which memory 5 generates a stored second information element which corresponds to the third information element, which second information element is supplied to the second input of comparator 4 via bus 12. Then processor 1 informs comparator 4 via control connection 22 that this second information element is to be supplied to transmitter 3 via bus 13 and informs transmitter 3 via control connection 23 that the second information element at the input of transmitter 3 is to be transmitted via bus 14 to the second arrangement. Further, processor 1 then addresses the third memory field 52, in response to which memory 5 generates a frequency parameter which corresponds to the second information element, which frequency parameter is supplied to processor 1 via bus 12. Processor 1 (acting as an adaptor) adapts this frequency parameter, for example by adding one unit to it, and sends the adapted frequency parameter back to memory 5 via bus 12, and addresses the third memory field 52, in response to which the adapted frequency parameter is stored.

In response to a further second control signal, processor 1 addresses the third memory field via control connection 20, in response to which memory 5 generates for example all stored frequency parameters, which are to be supplied to processor 1 via bus 12. Processor 1 (acting as a selector) then selects an extreme frequency parameter, for example the one with the highest value, and in response to that addresses the first memory field via control connection 20, in response to which memory 5 generates a second information element which corresponds to the extreme frequency parameter, which second information element is supplied to the second input of comparator 4 via bus 12. Then processor 1 informs comparator 4 via control connection 22 that this second information element is to be supplied to transmitter 3 via bus 13 and informs transmitter 3 via control connection 23 that the second information element at the input of transmitter 3 is to be transmitted via bus 14 to the second arrangement. Further, processor 1 then addresses the third memory field 52, in response to which memory 5 generates a frequency parameter which corresponds to the second information element, which frequency parameter is supplied to processor 1 via bus 12. Processor 1 (acting as an adaptor) adapts this frequency parameter, for example by adding one unit to it, and sends the adapted frequency parameter back to memory 5 via bus 12, and addresses the third memory field 52, in response to which the adapted frequency parameter is stored.

The addressing of memory 5 could be arranged at the hand of a column code and a row code. The different memory fields then each have a different column code, and the elements or parameters stored in one memory field each have the same column code but a different row code. A corresponding second information element and a corresponding third information element and a corresponding frequency parameter shall in that case have the same row code but different column codes. Further, different protocol states could be distinguished by defining one or a set of rows of each column as belonging to one protocol state. This offers the possibility that, when a second information element is to be generated and to be compared with a received first information element, instead of just one stored second information element being generated and compared or all stored second information elements subsequently being generated and compared, a first number of stored second information elements is selected and supplied to the comparator subsequently. In other words, only those second information elements belonging to a certain protocol state or states are taken into consideration by processor 1 (acting as a first selector). And this offers the possibility that, when a third information element is to be generated and to be compared with a received first information element, instead of just one stored third information element being generated and compared or all stored third information elements subsequently being generated and compared, a second number of stored third information elements is selected and supplied to the comparator subsequently. In other words, only those third information elements belonging to a certain protocol state or states are taken into consideration by processor 1 (acting as a second selector).

With the interface arrangement according to the invention, when the first protocol and the second protocol are the same, protocol errors can be corrected by storing all correct information elements as second information elements in the first memory field and by storing incorrect information elements (in other words deviations) as third information elements in the second memory field, which third information elements should each correspond to one second information element. In this case, when in the first memory field a second information element which is equal to the received first information element cannot be found, a (limited) search is started in the second memory field for a third information element which should be equal to the received first information element, and as soon as such a third information element has been found, the second information element which corresponds to this third information element is transmitted.

With the interface arrangement according to the invention, it becomes possible that the first protocol and the second protocol are slightly different by storing all second information elements in the first memory field and by storing all possible deviations as third information elements in the second memory field, which third information elements should each correspond to one second information element. In this case, when in the first memory field a second information element which is equal to the received first information element cannot be found, a (limited) search is started in the second memory field for a third information element which should be equal to the received first information element, and as soon as such a third information element has been found, the second information element which corresponds to this third information element is transmitted.

In case the first arrangement operates either according to a first protocol (thereby transmitting first information elements) or according to a third protocol (thereby transmitting fourth information elements), in the fifth memory field first information elements are stored and in the sixth memory field fourth information elements are stored. Processor 1 (acting as a third supplier) supplies the stored first information element to comparator 4 for again further comparing the received first information element with the stored first information element and (acting as a third selector) selects the third number of stored first information elements and supplies this third number of stored first information elements to comparator 4 subsequently, and in dependence of comparison results then supplies or does not supply the stored fourth information element to comparator 4 and selects or does not select the fourth number of stored fourth information elements and supplies or does not supply this fourth number of stored fourth information elements to comparator 4 subsequently. Then an interface arrangement is provided with which different protocols (one belonging to first information elements and one belonging to fourth information elements) as well as different protocol states can be taken into consideration. It should be observed that when the first protocol and the second protocol are completely identical, in that case the first memory field and the fifth memory field could be combined as one memory field. Further it is possible that, instead of using the fifth and the sixth memory fields, the first arrangement transmits a protocol code separately or transmits an information element comprising a protocol code, which protocol code indicates according to which protocol the first arrangement shall communicate. In that case it is unnecessary to use the fifth and the sixth memeory fields for storing first and fourth information elements, but these two memory fields could be used for storing fifth and sixth information elements (which correspond to the fourth information elements in the same way as the second and third information elements correspond to the first information elements).

First memory field 50 comprises second information elements, which should be stored in this first memory field 50 before the interface arrangement according to the invention starts operating. Second memory field 51 comprises third information elements, which either could be stored in this second memory field 51 before the interface arrangement according to the invention starts operating (for example by determining all deviations of the second information elements and storing these deviations), or which could be stored after the a deviation is received, in other words which could be stored after the interface arrangement according to the invention has started to operate. In the latter case, it should be determined with which second information element the received deviation corresponds, in other words it should be determined where (in which row) of the second memory field 51 the received deviation as a third information element should be stored. This could be done by for example calculating the distance between the received deviation and all or some second information elements and selecting the second information element which is nearest to the received deviation.

The calculation of distances not only could be used for filling memory 5, but also could be used as an alternative for using frequency parameters. In case a stored second information which is equal to the received first information element cannot be found, then the possibility exists of choosing between either looking for an equal third information element stored in the second memory field or selecting the second information element of which the frequency parameter stored in the third memory field has a certain value or selecting the second information element which is situated nearest the received first information element. The calculation of distances is of common general knowledge to a person skilled in the art, and is performed by comparing a bit of a word at a certain bit location with a bit of another word at the same certain bit location. The distance between these two words is equal to the number of pairs of different bits in both words, each pair of bits having the same unique bit location. So, in case an information element is a word comprising for example 256 bits, a distance between two information elements can easily be established. In case an information element is in a different form (for instance a term of a program language), it should first be transformed into a word comprising bits (a so called machine language), before a distance can be calculated.

With respect to the possibility of choosing between either looking for an equal third information element stored in the second memory field or selecting the second information element of which the frequency parameter stored in the third memory field has a certain value or selecting the second information element which is situated nearest the received first information element, it should be observed that it is possible to make this choice dependent upon (a part of) the history of the interface arrangement. In case for each one of one hundred first information elements which have previously been received a stored second information element has been found, the certain value of the frequency parameter shall be of more importance than when for each one of five first information elements which have previously been received a stored second information element has been found. Further, a possible choice of selecting either information elements stored in the fifth memory field or selecting information elements stored in the sixth memory field could also be made dependent upon (a part of) the history of the interface arrangement. In fact, each choice to be made by the interface arrangement according to the invention could be made dependent upon the history.

At the hand of the above it shall be clear that the interface arrangement according to the invention is very flexible due to the many possible options (different columns comprising different information elements and/or different parts of each column comprising different information elements and/or one or more other columns comprising frequency parameters could be activated to determine the meaning of information elements and to handle protocol errors and/or protocol deviations), and due to the possibility of for example transferring for example second information elements into for example third information elements (in other words storing them in the second memory field and deleting them in the first memory field) and/or vice versa (for example in dependence of changed protocols and/or frequency parameters which have a value which is for example too low for a corresponding second information element or for example too high for a third information element).

Instead of using different memory fields it is of course also possible to use different tables. Illustratively, a first table can be provided with three columns and comprise a first row respectively a user id xxx and a protocol version X.25 and a frequency parameter 1.0 and comprising on a second row respectively a user id yyy and a protocol version T.123 and a frequency parameter 0.8 and comprising on a third row respectively a user id yyy and a protocol version V.11 and a frequency parameter 0.2. Also, a second table being provided with five columns and comprise on a first row respectively a(00),p(00) and a(01),p(01) and a(02),p(02) and a(03) p(03) and a(04),p(04) and comprise on a second row respectively a(10),p(10) and a(11),p(11) and a(12),p(12) and a(13),p(13) and a(14),p(14) and etc., Here, each column can belong to a present state: each row can belong to a coming state. The second information element a(01) can indicate that the present state is row 0 and the coming state shall be row 1 The frequency parameter p(01) can indicate how many times the second information element a(01) has been received or selected. For example, a third table can be provided with five columns and comprising on a first row respectively b(00),a(00),p(00) and b(01),a(01),p(01) and b(02),a(02),p(02) and b(03),a(03)p(03) and b(04),a(04),p(04) and comprising on a second row respectively b(10),a(10),p(10) and b(11),a(11),p(11) and b(12),a(12),p(12) and b(13),a(13),p(13) and b(14),a(14),p(14) and etc. Here, column belongs to a present state, and each row belongs to a coming state. Then third information element b(01) indicates that the present state is row 0 and the coming state shall be row 1 and the second information element a(01) corresponds to the third information element a(01). The frequency parameter p(01) indicates how many times the third information element b(01) has been received or selected, etc.

We claim:

1. Interface arrangement for coupling a first arrangement based on a first protocol and a second arrangement based on a second protocol, which interface arrangement is provided with
    a receiver for receiving a first information element based on the first protocol from the first arrangement,
    a transmitter for transmitting a second information element based on the second protocol towards the second arrangement in response to the received first information element,
    a control arrangement comprising a memory for storing information elements,
    characterised in that the memory is provided with at least a first memory field for storing second information elements and a second memory field for storing third information elements, the control arrangement being provided with
    a comparator for comparing the received first information element with a stored information element and for generating a first control signal in case of equality and for generating a second control signal in case of inequality,
    a first supplier for supplying a stored second information element to the comparator for comparing the received first information element with the stored second information element and for, in response to the first control signal, supplying at least one of the received first information element and the stored second information element to the transmitter, and
    a second supplier for, in response to the second control signal, supplying a stored third information element to the comparator for further comparing the received first information element with the stored third information element and for, in response to a further first control signal, selecting a stored second information element which corresponds to the stored third information element and supplying the selected stored second information element to the transmitter.

2. Interface arrangement according to claim 1, characterised in that the control arrangement is further provided with
    a first selector for selecting a first number of stored second information elements and for controlling the first supplier for supplying this first number of stored second information elements to the comparator subsequently in response to subsequent second control signales, and
    a second selector for selecting a second number of stored third information elements and for controlling the second supplier for supplying this second number of stored third information elements to the comparator subsequently in response to subsequent further second control signales.

3. Interface arrangement according to claim 1, characterised in that the memory is further provided with at least a third memory field for storing frequency parameters which correspond to the stored second information elements, the control arrangement being further provided with an adaptor for, in response to the first control signal, adapting a stored frequency parameter, which frequency parameter corresponds to the second information element which is equal to the received first information element.

4. Interface arrangement according to claim 3, characterised in that the control arrangement is further provided with a selector for, in response to the second control signal, selecting an extreme frequency parameter and a corresponding second information element.

5. Interface arrangement according to claim 3, characterised in that the memory is further provided with at least a fourth memory field for storing further frequency parameters, the control arrangement being further provided with a further adaptor for, in response to the further first control signal, adapting a stored further frequency parameter, which further frequency parameter corresponds to the third information element which is equal to the received first information element.

6. Interface arrangement according to claim 5, characterised in that the control arrangement is further provided with a further selector for, in response to the further second control signal, selecting an extreme further frequency parameter and a corresponding third information element.

7. Interface arrangement according to claim 1, characterised in that the memory is further provided with at least a fifth memory field for storing first information elements and a sixth memory field for storing fourth information elements, the control arrangement being further provided with a third supplier for supplying a stored first information element to the comparator for again further comparing the received first information element with the stored first information element and for, in response to an again further first control signal, deactivating a fourth supplier for supplying a stored fourth information element to the comparator and deactivating a fourth selector for selecting a fourth number of stored fourth information elements and for controlling the fourth supplier, and a third selector for selecting a third number of stored first information elements and for controlling the third supplier for supplying this third number of stored first information elements to the comparator subsequently in response to subsequent again further second control signales.

8. A telecommunication system comprising a first arrangement based on a first protocol and an interface arrangement for coupling the first arrangement based on the first protocol and a second arrangement based on a second protocol, wherein the interface arrangement comprises:

a receiver for receiving a first information element based on the first protocol from the first arrangement;

a transmitter for transmitting a second information element based on the second protocol towards the second arrangement in response to the received first information element; and a control arrangement comprising a memory for storing information elements;

characterized in that the memory is provided with at least a first memory field for storing second information elements and a second memory field for storing third information elements, the control arrangement being provided with:

a comparator for comparing the received first information element with a stored information element and for generating a first control signal in case of equality and for generating a second control signal in case of inequality;

a first supplier for supplying a stored second information element to the comparator for comparing the received first information element with the stored second information element and for, in response to the first control signal, supplying at least one of the received first information element and the stored second information element to the transmitter, and a second supplier for, in response to the second control signal, supplying a stored third information element to the comparator for further comparing the received first information element with the stored third information element and for, in response to a further first control signal, selecting a stored second information element which corresponds to the stored third information element and supplying the selected stored second information element the transmitter.

9. Method for coupling a first arrangement based on a first protocol and a second arrangement based on a second protocol, which method comprises the steps of receiving a first information element based on the first protocol from the first arrangement, transmitting a second information element based on the second protocol towards the second arrangement in response to the received first information element, comparing the received first information element with a stored information element and generating a first control signal in case of equality and generating a second control signal in case of inequality, characterised in that the method comprises the steps of supplying a stored second information element and comparing the received first information element with the stored second information element and, in response to the first control signal, transmitting at least one of the received first information element and the stored second information element, and in response to the second control signal, supplying a stored third information element and further comparing the received first information element with the stored third information element and, in response to a further first control signal, selecting a stored second information element which corresponds to the stored third information element and transmitting the selected stored second information element.

10. Method according to claim 9, characterised in that the method comprises the steps of selecting a first number of stored second information elements and comparing this first number of stored second information elements subsequently with the received first information element in response to subsequent second control signales, and selecting a second number of stored third information elements and further comparing this second number of stored third information elements subsequently with the received first information element in response to subsequent further second control signales.

11. Method according to claim 9, characterised in that the method comprises the step of, in response to the first control signal, adapting a stored frequency parameter, which frequency parameter corresponds to the second information element which is equal to the received first information element.

12. Method according to claim 11, characterised in that the method comprises the step of, in response to the second control signal, selecting an extreme frequency parameters and a corresponding second information element.

13. Method according to claim 11, characterised in that the method comprises the step of, in response to the further first control signal, adapting a stored further frequency parameter, which further frequency parameter corresponds to the third information element which is equal to the received first information element.

14. Method according to claim 13, characterised in that the method comprises the step of, in response to the further second control signal, selecting an extreme further frequency parameters and a corresponding third information element.

15. Method according to claim 9, characterised in that the method comprises the steps of supplying a stored first information element and again further comparing the received first information element with the stored first information element and, in response to an again further first control signal, deactivating the supplying of a stored fourth information element and deactivating the selecting of a fourth number of stored fourth information elements, and selecting a third number of stored first information elements and again further comparing this third number of stored first information elements subsequently with the received first information element in response to subsequent again further second control signales.

* * * * *